(12) United States Patent
Beamish et al.

(10) Patent No.: US 6,731,747 B2
(45) Date of Patent: May 4, 2004

(54) SIGNAL DETECTOR WITH ECHO CANCELLATION

(75) Inventors: Norman J. Beamish, Costa Mesa, CA (US); Jeffrey D. Klein, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 411 days.

(21) Appl. No.: 09/792,816

(22) Filed: Feb. 23, 2001

(65) Prior Publication Data

US 2002/0118821 A1 Aug. 29, 2002

(51) Int. Cl.[7] .............................................. H04M 1/00
(52) U.S. Cl. ............ 379/386; 379/142.04; 379/215.01; 379/406.01
(58) Field of Search ............................ 379/386, 215.01, 379/283, 373.01, 373.02, 351, 142.04

(56) References Cited

U.S. PATENT DOCUMENTS

| | | | |
|---|---|---|---|
| 5,054,052 A | 10/1991 | Nonami | |
| 5,974,138 A | 10/1999 | Sambhwani et al. | |
| 6,108,413 A | 8/2000 | Capman et al. | |
| 6,167,133 A | 12/2000 | Caceres et al. | |
| 6,269,160 B1 * | 7/2001 | Bartkowiak | 379/386 |
| 6,498,848 B1 * | 12/2002 | Sandre | 379/386 |

* cited by examiner

*Primary Examiner*—Minsun Oh Harvey
*Assistant Examiner*—Jefferey Harold
(74) *Attorney, Agent, or Firm*—Weide & Miller, Ltd.

(57) ABSTRACT

A system is disclosed for accurately detecting an alert signal. Improving detector accuracy decreases missed detects and false detects. In one example embodiment the detector monitors received telephone signals for an alert signal such as a CPE alert signal. In such a configuration, the invention processes the received signal prior to monitoring by the detector to remove or reduce unwanted echo, interference and/or other signal portions that may otherwise inhibit accurate detection of alert signals sent from a remote location. In one configuration, the invention performs echo suppression or cancellation on the received signal to eliminate or reduce echo, such as may be introduced by a hybrid.

12 Claims, 5 Drawing Sheets

SIGNAL DETECTOR WITH ECHO CANCELLATION

BACKGROUND OF THE INVENTION

1. Technical Field

This invention relates generally to telephone systems and in particular to signal detectors with echo cancellation features.

2. Related Art

Advances in technology have increased the features available to telephone service subscribers. One widely offered and commonly subscribed to advanced feature is caller identification and call waiting. Caller identifier ("caller ID") allows a subscriber to received information at the time of a call regarding the calling number and, in some instances, the name of the calling party. This information appears on a display or screen. Call waiting allows a subscriber to receive an indication, often an audible series of beeps while the subscriber is using the telephone, that another party is calling their number. Caller ID and call waiting can be combined so that while a subscriber is on the telephone, the call waiting feature will notify the subscriber of an incoming call and the caller ID display will provide information about the calling party.

The caller ID and call waiting information is sent to the subscriber, and in particular, to the customer premise equipment ("CPE") using special tones known as customer premise alert signals ("CAS"). These signals are sent over standard telephone lines. The CPE includes a monitor or detector, often referred to as CAS detector that monitors for CAS.

There are numerous other types of systems that rely on receipt of detected alert signals for operation. CAS detectors that detect caller ID and call waiting information are one exemplary system that relies on monitoring and detection of transmitted alert signals for desired operation.

Regardless of the particular type of system that relies on the detection of signals for proper operation, one important aspect of operation is that these types of systems accurately detect when a signal is being sent and thereafter accurately receive the signal. Failure to accurately detect or receive a signal prevents the system from operating. In the case of caller ID and call waiting signals, failure to detect a CAS signal will lead to missed calls or failure of the call waiting display to provide the desired information regarding an incoming call.

One problem with prior art CAS detectors is that the signal detectors have difficulty detecting the alert signals. This is especially true for CAS sent while the telephone is off-hook and conversation is occurring. The conversation on the line often disrupts desired detector operation and may lead to missed detects or false detects. A false detect is when the detector falsely detects a signal and initiates action based on the false detect.

Another deficiency is that the operational environment often creates additional unwanted signals and noise that can further disrupt operation of the signal detectors. One example of an undesirable signal that may disrupt desired detector operation is echo. One source of unwanted echo is from a hybrid, a device commonly found in telephones to convert the incoming/outgoing signal path from two conductors to four conductors. Conversely, a hybrid also reduces the signal path from four conductors carrying signals from the telephone to two conductors for transmission to the central office. As signals pass through the hybrid, which is typically not perfectly isolated, reflection signals are created. In addition, the hybrid may create side tones that further disrupt desired detector operation. As a result there is a need for an alert detector configured to reduce or eliminate missed detects or false detects.

SUMMARY

The invention provides a system to overcome the undesired effects of the echo that is generated as a signal passes through apparatus of a telephone network. This invention also provides a system for alert detection. Alert detection comprises the monitoring of a received signal for an alert signal. The received signal may comprise a plurality of various signals that interfere with the accurate detection of the alert signal. In an alternative embodiment, signals other than an alert signal may be detected by the invention.

In one embodiment, the invention comprises a signal processor configured to tap into an input line and into an output line, the input line carrying a received signal, the output line carrying a transmitted signal. The signal processor processes the received and transmitted signals to remove various unwanted portions from the received signal to facilitate more accurate detection of the alert or other signals. Removing the unwanted portions of the received signal improves detector operation by reducing signals that may trigger false detects or missed detects. In one embodiment the unwanted signal portions comprise near end echo.

The detector may be configured to receive the processed signal and detect an alert. In alternative embodiments, the invention may comprise a receiver connected to the input line and the detector such that the detector selectively activates the receive when the detector detects an alert signal. Thus the detector activates the receiver to receive data or other information upon detection of an alert signal. In one embodiment, the receiver may be configured to receive and demodulate frequency shift key modulated signals.

In one example operational mode, the invention may improve the accuracy of a signal detector configured to detect a first signal on an input carrying a combined signal. The combined signal may intermittently comprise multiple signals, such as a first, second and third signal. In example method, the system receives and filters the combined signal to remove or reduce the third signal. Next, the invention monitors the filtered combined signal to detected when the first signal is part of the combined signal. In this manner the accuracy of monitoring is improved by removing the third signal because the third signal may comprise an echo signal. The first signal may comprise a customer premise alert signal ("CAS"). The second signal may comprise a voice signal.

In one embodiment the method also comprises activating a detector to receive a forth signal, the fourth signal being sent from a remote location after the monitoring detects the first signal. The fourth signal may comprise caller ID information.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principals of the invention. Moreover, in the figures, like reference numerals designate corresponding parts throughout the different views.

DETAILED DESCRIPTION

This invention provides a system for improving the performance of a signal detector. The invention is particularly well suited for use in an environment where the signal must be detected over other signals or noise on the channel. One example environment for implementation of the detector is in telephone or associated systems, commonly known as customer premise equipment. In this environment the detector detects signals sent from the central office. In one embodiment these signals comprise alert signals. One example of an alert signal is a CPE alert signals ("CAS") as might be used to notify the CPE that caller identification ("caller ID") information or call waiting information is being sent. Although one embodiment of the invention is described in relation to CPE and CAS the invention can find use in a variety of other environments or applications. The invention will benefit any system where detection of a signal is desired.

In the case of a CPE environment, the alert detector should operate during various modes of telephone operation. The telephone may be off-hook or on-hook. During the on-hook state there is no conversation on the line and hence the detector is less likely to generate missed detects or generate false detects. However, when the phone is off-hook conversation is often occurring and the detector must attempt to detect the alert signal over these other signals. This is more difficult for the detector and missed detects or false detects may occur.

Figure 1:
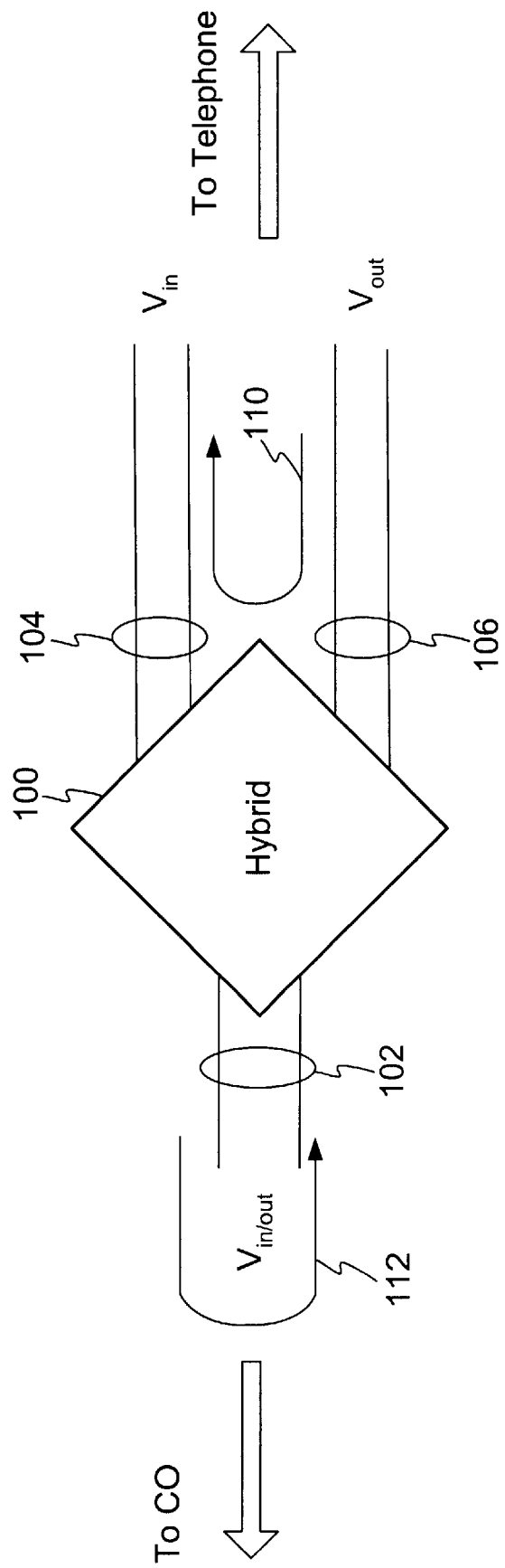
FIG. 1 is a block diagram of a hybrid.

The alert detector typically receives numerous unwanted signals that can interfere with proper detection. FIG. 1 illustrates a block diagram of a hybrid 100 as is commonly found in CPE. This hybrid 100 comprises a 2-to-4 hybrid. The hybrid 100 includes two conductors 102 that travel to the central office ("CO"). The hybrid 100 also includes four conductors 104, 106 that connect to systems within the CPE. The four conductors include two input signal conductors 104 and two output conductors 106. The input conductors 104 carry signals from the CO to the CPE. The output conductors 104 carry signals from the CPE to the CO.

In operation, as the user of the CPE transmits a voice signal, the signal travels to the hybrid 100 on the signal output line 106. The majority of the power of the output signal passes through the hybrid 100 and travels to the CO. However, some of the output signal is reflected back to the input conductors 104 as an undesired echo. The inventors determined that the echo received on the input conductors 104 comprises two signal components, near end echo 110 and far end echo 112. Near end echo 110 comprises an unwanted signal transferred to the input conductor 104 from the signal on the output conductor 106 when an outgoing signal passes through the hybrid 100. Far end echo 112 comprises an unwanted signal received on the input conductor 104 that is reflected back from the CO or other equipment between the CO and the hybrid 100. Both the near end echo 110 and the far end echo 112 interfere with the CAS detectors ability to accurately detect a CAS sent from the CO.

The more disruptive portion of the echo is the near end echo 110 because it is received at a higher power level than the far end echo 112. As a result, the near end echo 110 is disruptive to the detector.

Figure 2:
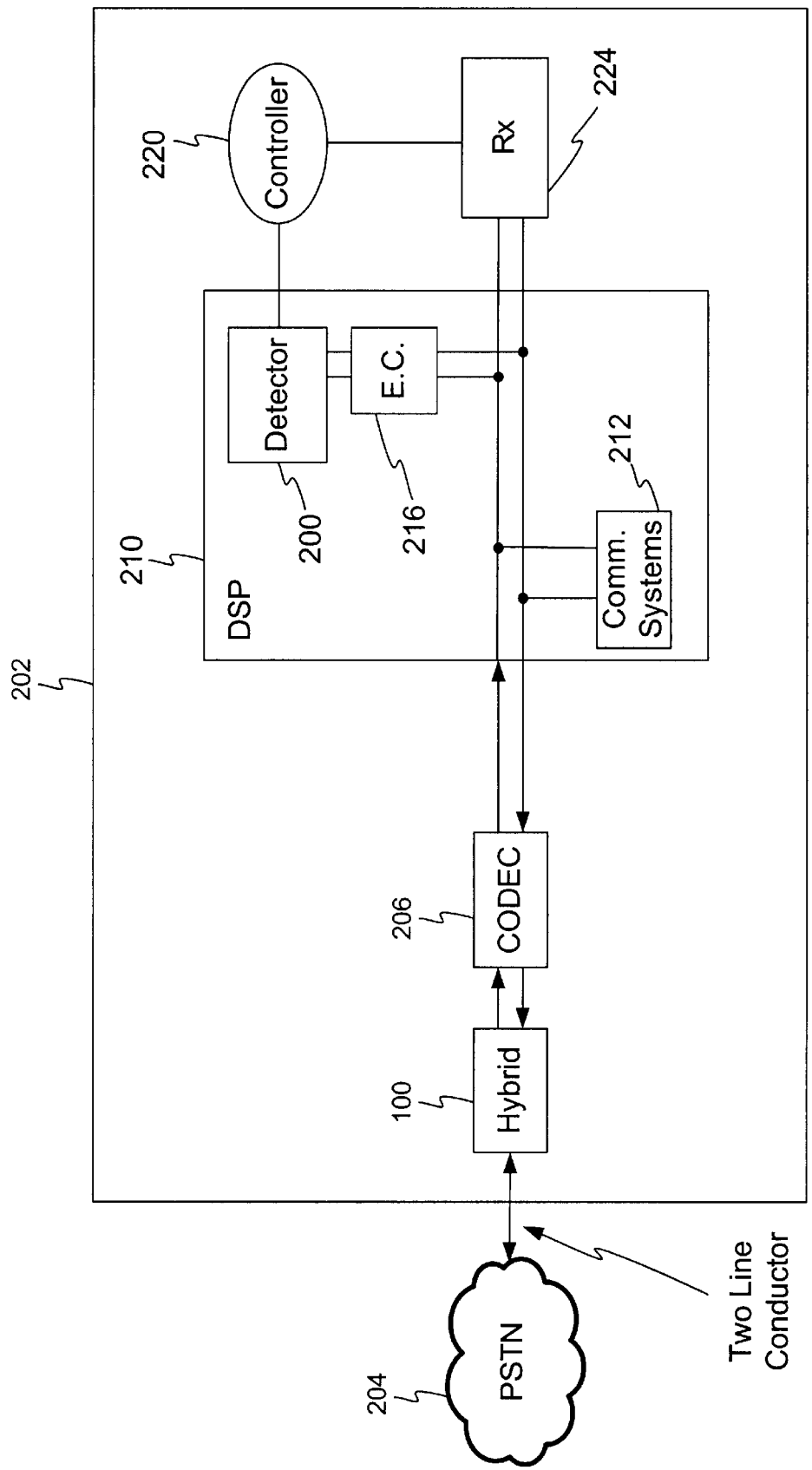
FIG. 2 is a block diagram of an example operating environment.

FIG. 2 illustrates an example environment of use of the invention. In one embodiment the invention is incorporated for use with a CAS detector 200 of a telephone 202. The telephone 202 connects to a telephone network 204, such as the PSTN. The telephone 202 includes a hybrid 100 that operates as described above. A coder/decoder ("CODEC") 206 connects to the hybrid 100. The CODEC 206 performs coding and decoding on the telephone signals and performs conversion of the incoming signal from the analog domain to the digital domain and conversion of outgoing signals from the digital domain to the analog domain.

The CODEC 206 connects to a digital signal processor (DSP) 210 configured to perform specialized digital processing and calculations on digitized signals. The DSP 210 provides the advantages of powerful mathematical computational ability and programmability for tailored operation in a particular application. Devices besides a DSP may be adopted for use. These devices includes processors with associated code or logic configurations or other signal processing apparatus.

In this embodiment the DSP 210 is configured to perform various signal processing tasks. One portion of the DSP 210 is a CAS detector 200 configured to monitor for and detect a CAS signal sent from the CO to indicate upcoming transmission of important information. Other portions of the DSP 210 are dedicated to standard telephone operations, referred to on FIG. 2 as communication systems 212.

An echo canceller 216 connects to the conductors that connect the CODEC 206 to the communication systems 212 of the DSP 210 so that the incoming signal presented to the communication systems is also presented to the echo canceller. The output of the echo canceller 216 connects to the CAS detector 200. The echo canceller 216 processes the received signal to remove echo portions of the received signal before presenting the received signal to the CAS detector 200.

The echo canceller 216 taps into the input conductor and the output conductor that connects to the communication system. These line taps provide signals to the echo canceller 216 so that it may processes the incoming signal to remove unwanted signal portions from the incoming signal. After removing these unwanted signal portions, the echo canceller 216 provides the processed signal to the CAS detector 200. In one embodiment, the echo canceller 216 subtracts the near end echo from the received signal and then provides only the received signal to the CAS detector 200.

After the CAS detector 200 receives the processed signal from the echo canceller 216, it performs filtering and processing on the signal to monitor for a CAS being sent from the CO. In one embodiment, the CAS may be a dual tone signal comprising a combination of 2130 Hz and 2750 Hz signals that are 80 milliseconds in duration. In another embodiment, the CAS detector 200 is configured to detect this type of signal. The CAS detector 200 may be configured to detect other signals other than the dual tone signal.

The output of the CAS detector 200 connects to a controller 220. As shown, the controller is external to the DSP. In other embodiments, the controller 220 may be embodied in the DSP 210. The controller 220 receives a signal, such as an interrupt, from the detector 200 that a CAS was sent and detected. The CAS indicates that caller ID or call waiting information is going to be or is being sent from the CO.

The controller 220 connects to and controls a receiver 224 configured to decode or demodulate the data sent after the CAS is detected. In one embodiment the receiver 224 comprises a frequency shift keying modulated signal receiver. The controller 220, upon receipt of an input from the CAS detector 200, sends a signal to the receiver 224 that turns on or enables receiver operation. The receiver 224 is thus active and able to receive and demodulate the information being sent by the CO. The receiver 224 may optionally output this information to an LCD for display, such as to display caller ID information. The controller 220 may seize the channel to prevent the incoming data from being processed by the communication systems 212 and hence heard by the user of the telephone during the conversation.

Figure 3:
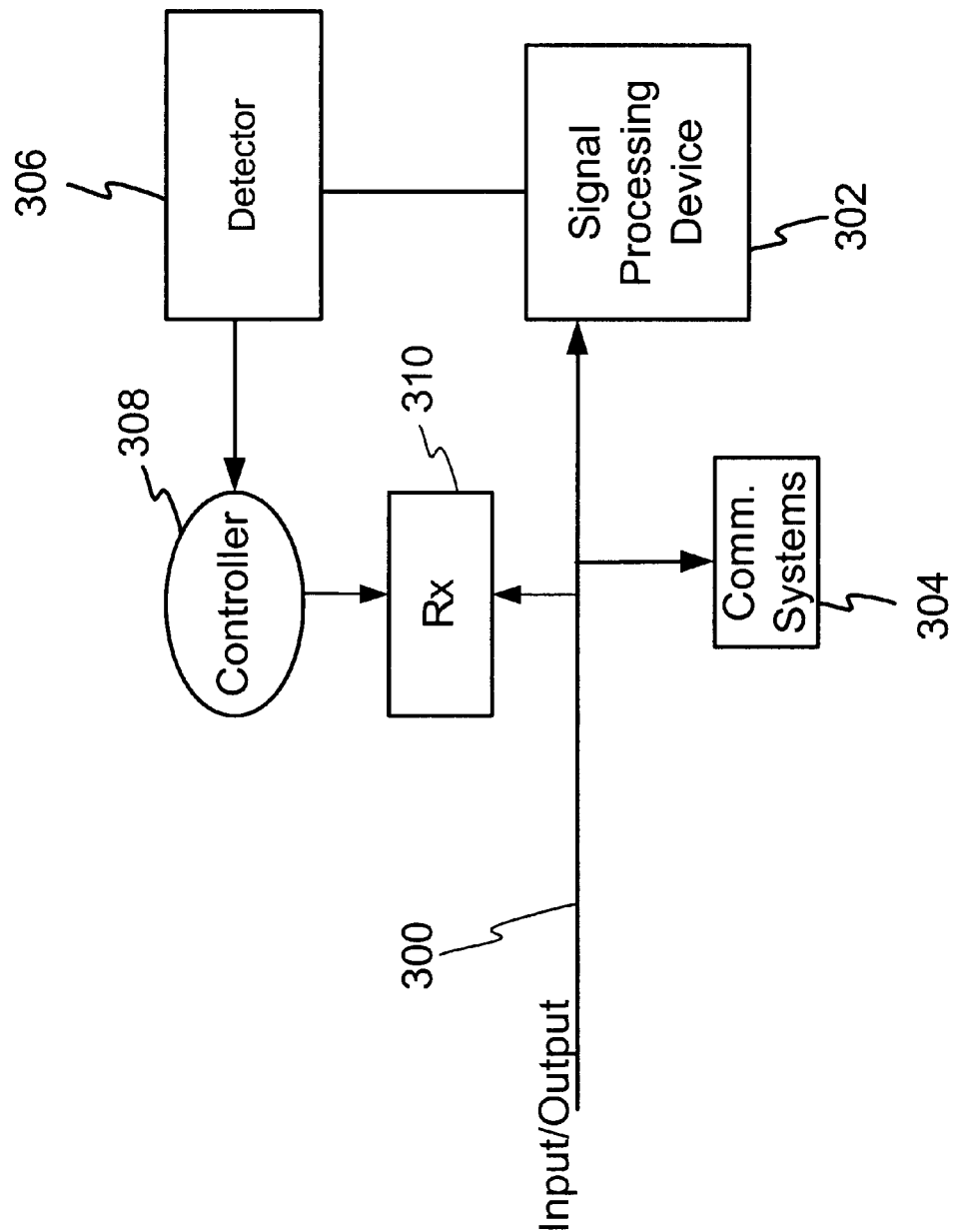
FIG. 3 is a block diagram of an example embodiment.

FIG. 3 illustrates an alternative embodiment of the invention configured more generally to operate with a variety of systems including, but not limited to, CAS detection systems. An input/output line 300 connects to a signal processing device 302 and a communication system 304. The signal processing device 302 connects to a detector 306. The output of the detector 306 controls a receiver 308, the receiver being configured to selectively receive the input from the input/output line 300. A controller 308 may reside between the detector 306 and the receiver 314.

In operation the input/output line 300 carries incoming and/or outgoing signals. It is contemplated that unwanted interference, noise, echo, reflection, or any other unwanted additions to the incoming signal may be combined with the incoming signal. This unwanted portion may undesirably disrupt operation of the detector 306. As a result, the detector may fail to accurately detect alert signals sent to the detector 306 on the input/output line 300.

To overcome this disadvantage, the invention includes a signal processing device 302 to remove the unwanted portions of the incoming signal. After removing the unwanted portions, the signal processing device 302 presents the processed signal to the detector 306. The detector 306 is thus able to accurately detect an alert signal sent to the detector on the input/output line 300 because the unwanted portion no longer interferes with accurate detection.

If the detector does detect an alert signal, it provides an interrupt to the controller 308. Alternatively, the alert or interrupt may be provided directly to the receiver 310. The receiver 310 begins monitoring and receiving signals on the input/output line 300 as intended by the apparatus transmitting information or data.

Figure 4:
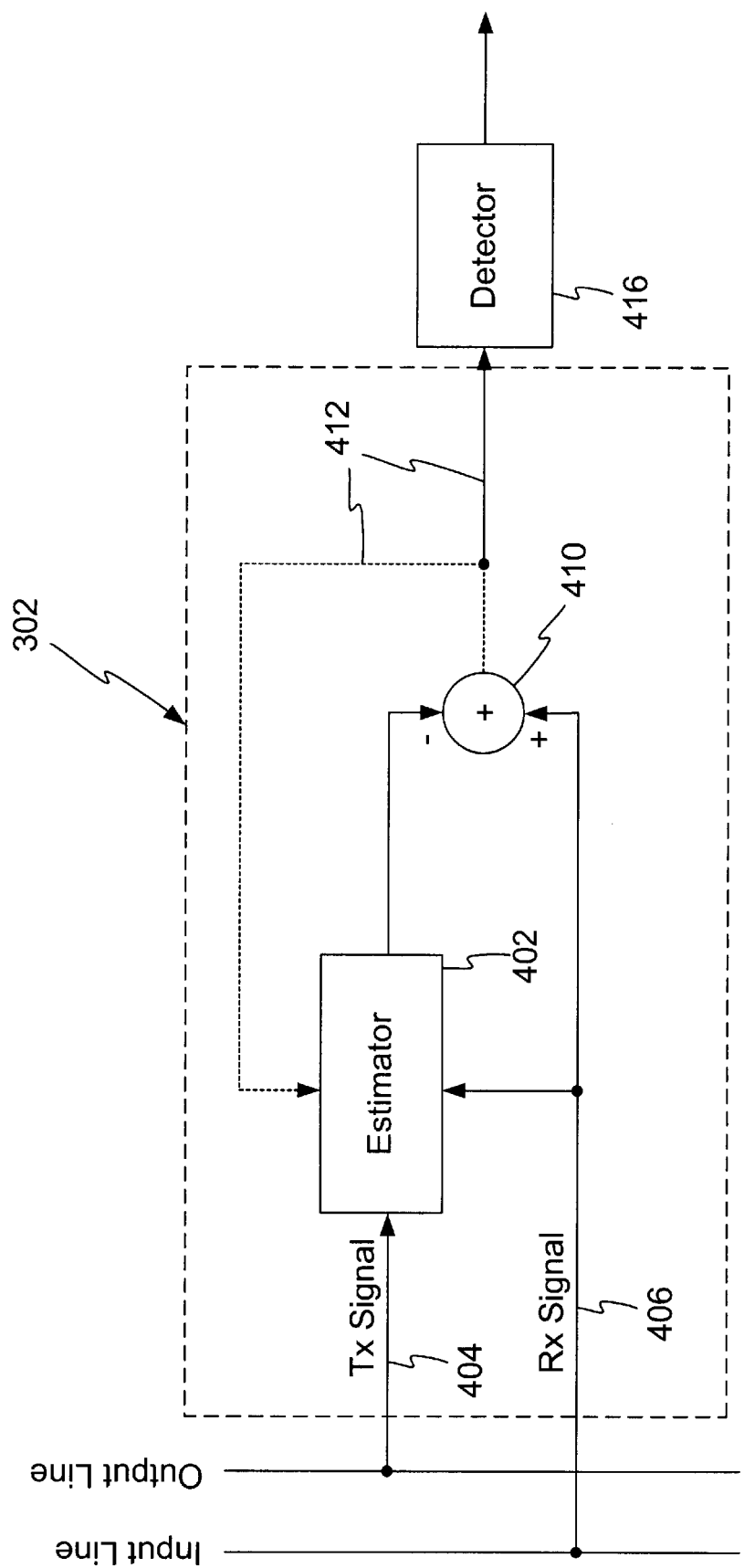
FIG. 4 is a block diagram of an example embodiment of an echo canceller.

FIG. 4 is a block diagram of an example implementation of the signal processing device 302 shown in FIG. 3. In this example implementation, the signal processing device 302 comprises an echo canceller using adaptive feedback to dynamically track and cancel near end echo. As shown, an estimator 402 receives the transmitted signal on an input 404 that connects to a conductor carrying the transmitted signal. The estimator 402 also receives the received signal on a input 406 that connects to a conductor carrying the received signal.

The input 406 also connects to a summing junction 410. The summing junction 410 also receives input comprising the output signal from the estimator 402. The output of the estimator 402 is subtracted from the signal received on the input 406 to create a summing junction output on the summing junction output line 412. The summing junction output 412 connects to a detector 416 and feeds back into the estimator 402. The output of the detector 416 comprises a signal indicating when the detector has detected a predetermined signal, such as an alert signal. In one embodiment, the detector 416 may providing this output to a receiver or controller. In other embodiments, the detector 416 continues to receive the signal and passes it directly to a receiver or other processing device.

In one embodiment, the estimator 402 comprises a finite impulse response (FIR) filter operating in the digital domain. In general, a digital filter is designed to manipulate discrete data sequences to remove noise, extract information, or perform other processing. The FIR filter is a linear discrete time system that forms its output as the weighted sum of the most recent and a finite number of past inputs. The FIR may be time invariant or time variant in design and operation. In one embodiment the estimator 402 is a adaptive FIR filter. The adaptive FIR provides the advantage of actively and dynamically adapting to the channel characteristics to improve operation.

In operation, the system 302 shown in FIG. 4 operates as follows. The estimator 402 receives the transmitted signal on input 404 and the incoming received signal on input 406. The estimator 402 also receives feedback on summing junction output 412. The estimator 402 isolates the portion of the received signal on input 406 that is the unwanted interference and, using summing junction 410, subtracts the interference from the received signal. The output of the summing junction 410 thus comprises the received signal without the unwanted interference.

In one embodiment, the interference comprises near end echo and the estimator comprises an adaptive FIR. In this configuration the estimator utilizes the transmitted signal and the received signal to make an estimate of the amount of near end echo. Near end echo can be evaluated based on a comparison of the transmitted and received signal. In another embodiment, the difference between the received signal and the output of the estimator 402 is routed back to the estimator to control the weighting of the coefficients of the FIR filter. A training sequence may also be used to establish coefficient weighting. The training phase may occur as part of the initialization process or periodically during operation. In one embodiment a least mean square algorithm is adopted to minimize the error and to adapt to time-varying environments.

Because the signal processing device generates the received signal without the near end echo, the detector 416 more accurately detects signals sent to the detector. The estimator 402 is able to adapt to changing channel conditions and to various levels of interference or near end echo.

Figure 5:
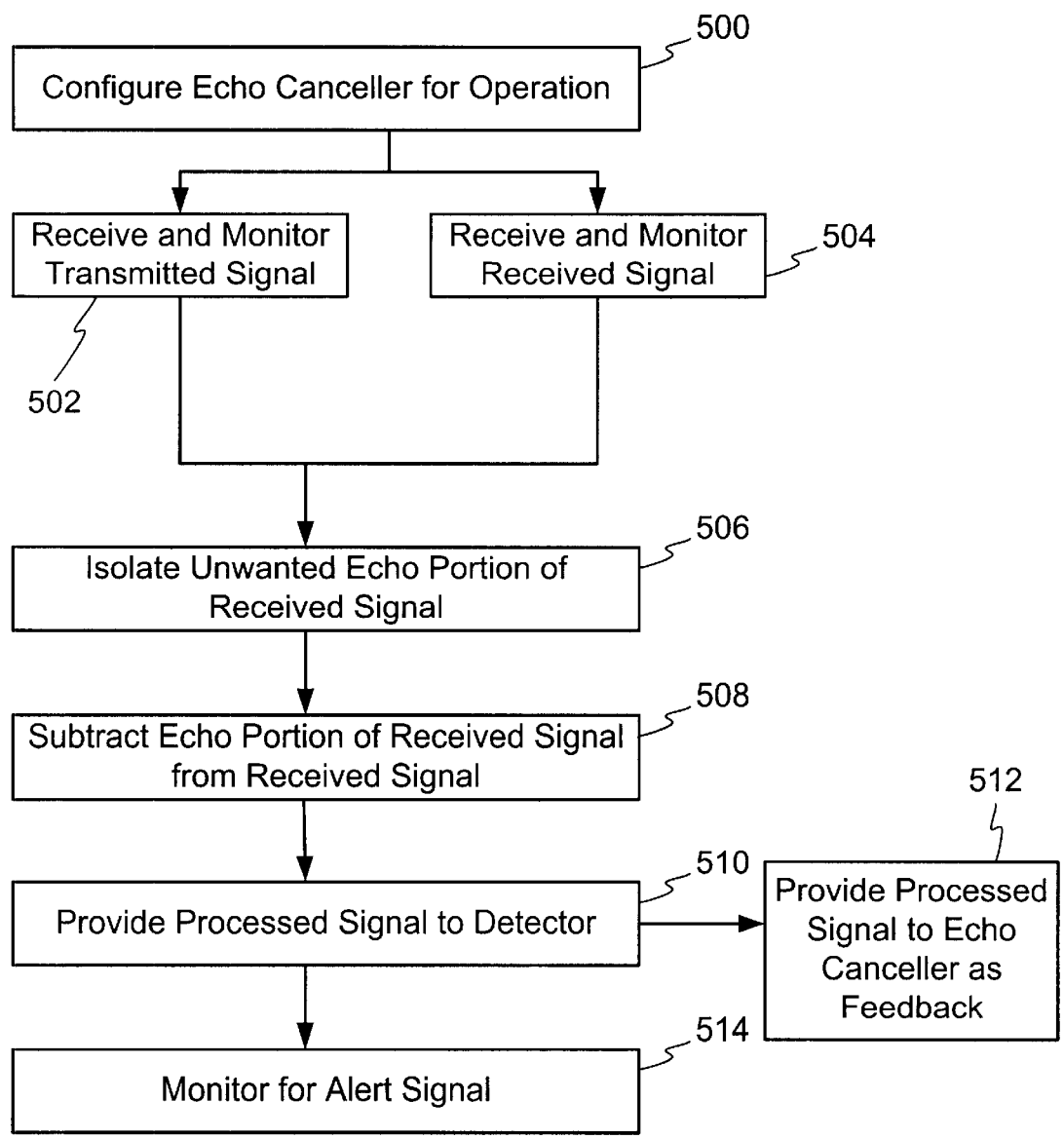
FIG. 5 is a flow chart of a method of operation of the invention.

FIG. 5 is a flow chart of an example method of operation. The invention is not limited to this method of operation which is provide for purposes of understanding on not limitation. At step 500, the system initializes or configures the echo canceller for operation. In one embodiment, this comprises determining the coefficients of a finite impulse response filter that is configured as a near end echo canceller. The coefficients may be determined during a training sequence or during manufacturing based on estimated equipment and echo characteristics. Apparatus other than an echo canceller may be used.

Next, at step 502, the system receives and monitors the signal transmitted from the device. In one embodiment, the device comprises a telephone and the transmitted signal comprises the signal sent from the telephone. The system also receives and monitors the received signal at step 504. In another embodiment, the received signal is understood to comprise a signal sent from one or more telephones connected to the system and an echo portion. The echo portion is understood to be generally undesirable and may interfere with operation of a detector configured as part of the system or connected to the system.

After receiving these signals the system isolates the unwanted echo portion of the received signal that contains the unwanted echo. This occurs at step 506. In one embodiment this operation is performed by an echo canceller.

At step 508, the system subtracts the isolated echo portion from the originally received signal to create a processed signal. As a result, the received signal, without unwanted echo, may be isolated for use by the system. Removing the echo portion of the received signal is but one example of the type of unwanted signal components that may be removed in accordance with the invention. In other operating environments signal components other than echo may be removed to obtain a signal void of unwanted components. This will increase detector or receive accuracy in a variety of systems.

Next, at step 510, the system provides the processed signal to a detector or other receiver with capability to monitor for a particular type of signal. In one embodiment the detector comprises a CAS detector configured to monitor for a CAS from a central telephone office.

At step 512, the system may provide the processed signal, as feedback, to the echo canceller. The operation thus continues in this manner as shown so that the coefficients may be dynamically set or changed in real time. In other embodiments the processed signal is channeled back to the echo canceller only at start-up or during a training sequence.

At step 514, the detector monitors for an alert signal. The alert signal may comprise any signal or pattern of tones. The alert may be an alert signal that provides an indication that information signal is to be sent or the alert signal may comprise data. After step 514, the operation returns to step 502 and step 504 and the process continues.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. An customer premise alert signal (CAS) receiver system, comprising:

an echo canceller configured to connect to an input line and an output line and generate a processed signal, where the input line carries a received signal and the output line carries a transmitted signal such that the signal processor receives the received signal and the transmitted signal;

a detector configured to receive the processed signal and detect a CAS signal as part of the processed signal, the processed signal comprising a processed version of the received signal from the echo canceller;

a receiver connected to the input line, where the receiver is selectively controllable between an on-state and an off-state, and wherein the receiver is configured, when in the on-state, to receive a caller-ID information; and a controller, in communication with the detector and the receiver, the controller configured to activate the receiver from the off-state to the on-state upon detection, by the detector, of an CAS signal.

2. The system of claim 1, wherein the echo canceller comprises a finite impulse response filter.

3. The system of claim 1, wherein the receiver comprises a receiver configured to receive and demodulate frequency shift key modulated signals.

4. The system of claim 1, wherein the receiver, when in an off-state, consumes less power than when the receiver is in the on-state.

5. A method for detecting an alert signal sent from a remote location and receiving information from the remote location, comprising:

receiving an input signal on an input line, the input signal including unwanted signal portions;

processing the input signal to remove the unwanted signal portions of the input signal to create a processed signal;

monitoring the processed signal to detect an alert;

responsive to detection of the alert, turning on a receiver from an inactive state to an active state to thereby allow the receiver to receive the alert signal, an information signal, or both; and receiving the information signal with the receiver.

6. The method of claim 5, wherein the alert comprises a customer premise alert signal.

7. The method of claim 5, wherein the monitoring is performed by an alert detector embodied in a digital signal processor.

8. The method of claim 5, wherein processing the input comprises filtering the input.

9. The method of claim 5, wherein processing the input comprises performing echo cancellation and the unwanted signal portion comprises near end echo.

10. The method of claim 5, wherein the method is performed in a telephone.

11. An customer premise alert signal (CAS) and an information signal receiver system, comprising:

means for generating a processed signal, the means for generating connected to an input line and an output line, where the input line carries a received signal and the output line carries a transmitted signal;

means for receiving the processed signal and detecting an CAS signal as part of the processed signal, the processed signal comprising a processed version of the received signal from the means for generating a processed signal;

said means for receiving connected to the input line and connected to the means for receiving and detecting, where the means for receiving selectively receives the information signal when the means for receiving and detecting detects an alert signal; and means for controlling the means for receiving, wherein responsive to a signal from the means for receiving and detecting, the means for controlling selectively turns on the means for receiving to an active status.

12. A system for detecting an customer premise alert signal (CAS), comprising:

means for filtering configured to isolate echo from a combined signal comprised of a received signal and echo;

means for combining configured to subtract the output of the means for filtering from the combined signal; and means for detecting configured to receive the output of the means for combining and monitor for an CAS signal; and means for activating a receiver, the means for activating a receiver configured to turn on a receiver in response to detection of the CAS signal by the means for detecting.

* * * * *

UNITED STATES PATENT AND TRADEMARK OFFICE
CERTIFICATE OF CORRECTION

PATENT NO. : 6,731,747 B2
DATED : May 4, 2004
INVENTOR(S) : Norman J. Beamish and Jeffrey D. Klein It is certified that error appears in the above-identified patent and that said Letters Patent is hereby corrected as shown below:

Column 7,
Line 46, delete "An" and insert -- A --

Column 8,
Line 32, delete "An" and insert -- A --

Column 8,
Lines 38, 52 and 60, delete "an" and insert -- a --

Signed and Sealed this

Third Day of August, 2004

JON W. DUDAS
*Acting Director of the United States Patent and Trademark Office*